INVENTOR.
RICHARD R. BOWER
BY
Christie, Parker & Hale
ATTORNEYS.

April 20, 1965

R. R. BOWER 3,179,236

ARTICLE HANDLING MACHINE

Filed May 16, 1960

INVENTOR.
RICHARD R. BOWER
BY
Christie, Parker & Hale
ATTORNEYS.

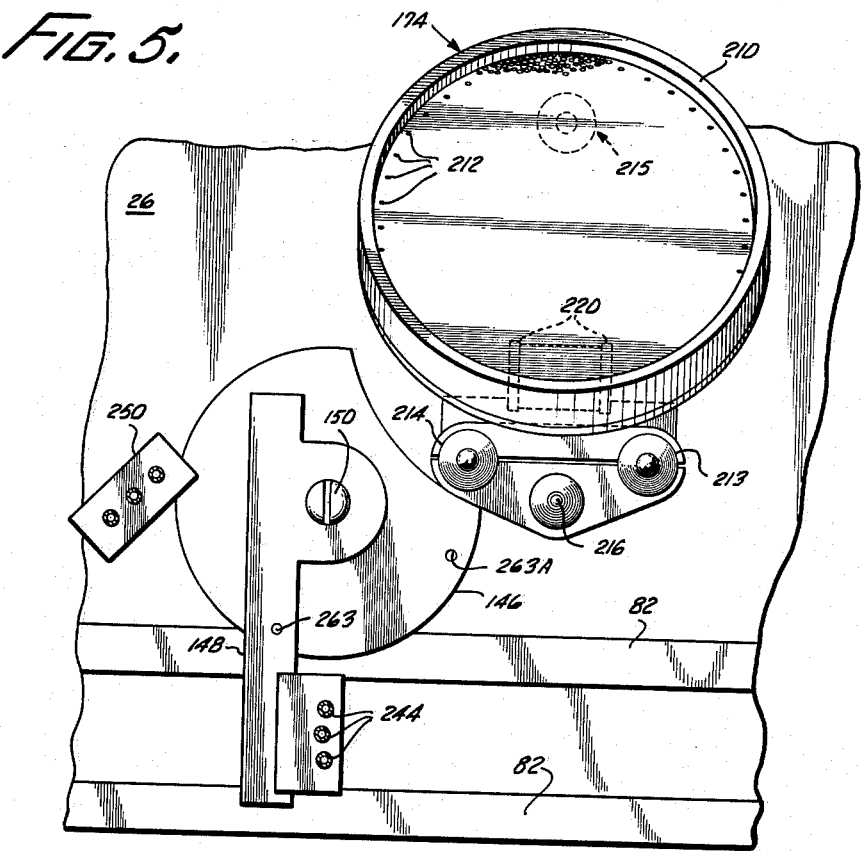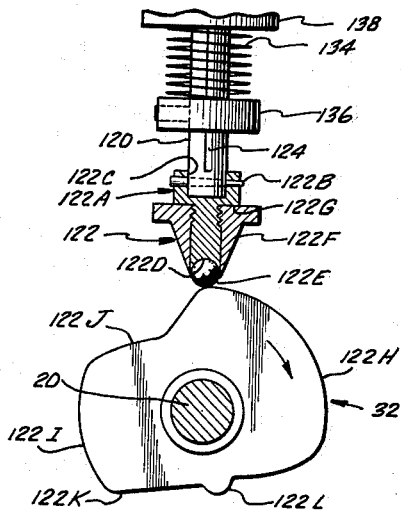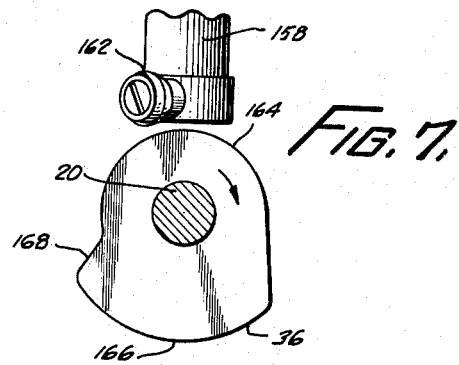

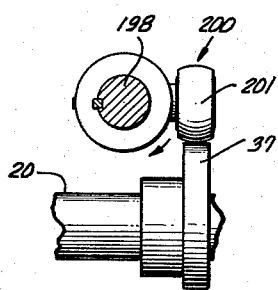
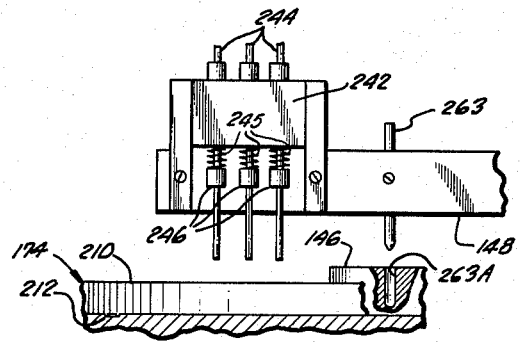
FIG. 8.   FIG. 9.
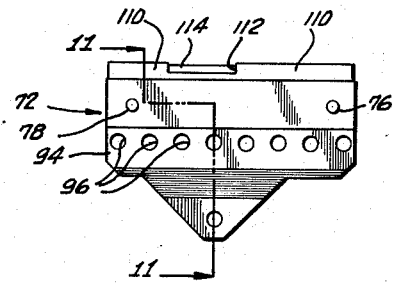
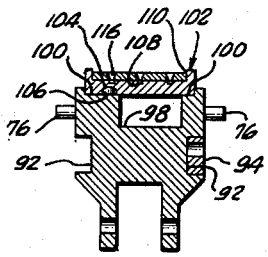
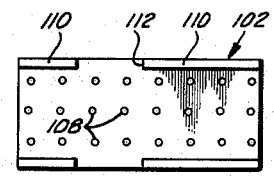
FIG. 10.   FIG. 11.   FIG. 12.
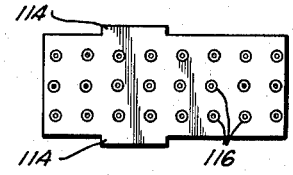
FIG. 13.
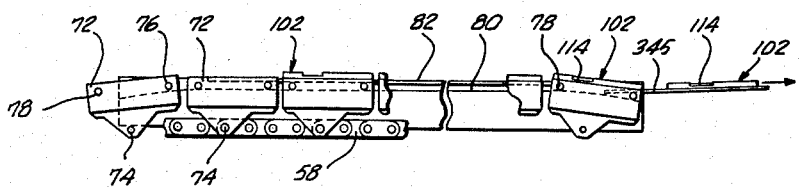
FIG. 14.
INVENTOR.
RICHARD R. BOWER
BY
ATTORNEYS.

3,179,236
ARTICLE HANDLING MACHINE
Richard R. Bower, Los Altos Hills, Calif., assignor to Rheem Manufacturing Company, New York, N.Y., a corporation of California
Filed May 16, 1960, Ser. No. 29,507
1 Claim. (Cl. 198—131)

This invention relates to machines for automatically handling individual articles.

In many industries it is necessary to handle or process a large number of individual articles on a mass production basis. Doing such a job by hand is expensive, and often subject to human error, particularly when the articles to be handled must be selected at random from a large group of loosely stored items, and thereafter be subjected to precision operations or processing.

This invention provides a machine which automatically selects individual articles from a loose batch of the articles and accurately positions the selected articles in a first or loading position. The selected articles are then automatically transferred from the loading position to a carriage or conveying position, and thereafter moved from the conveying position for further handling or processing.

The machine of this invention is ideally suited for handling small delicate articles such as components for watches, zippers, vacuum tubes, etc., as well as other types of items.

In many industries thousands of small pieces or articles must be moved through and subjected to various processing stages. This invention provides a machine for automatically handling such articles and thereby eliminating much of the human error accompanying this type of work when it is done manually, resulting in cheaper and more reliable products.

Briefly, the invention contemplates apparatus which includes means for selecting an article at random from a group of the articles, and means for moving the selected article from the group to a loading location. Means are also provided for moving the selected article from the loading location to a conveying location, and means for moving the article from the conveying location for further processing or handling.

In the preferred form of the invention, the article is lifted from the loading location by vacuum, and dropped at the conveying location by pressure, and thereafter removed from the conveying location by an endless conveyor. Preferably, a single cam shaft is used to provide power for and synchronize the various steps of selecting an individual article from the batch of loose articles, moving it from the batch of loose articles to the loading location, transporting it from the loading location to the conveying location, and carrying it away from the conveying location.

Preferably, the loose group of articles to be handled are held in a container which has a bottom with at least one recess in its upper surface to receive one of the articles. Means are provided for moving or vibrating the container so that an article slides into the recess in the bottom of the container and is lodged there. Means are provided for moving the recessed portion of the container and the selected article away from the remaining loose articles and into a loading location.

Preferably, the selected article is picked up from the loading position by a tube mounted on an arm which includes means for moving the arm and tube from the loading location to the conveying location so that an open end of the tube is successively adjacent the recessed portion of the container and adjacent the conveying location. Means are provided for automatically reducing the pressure inside the tube when it is adjacent the loading location, and for increasing the pressure in the tube when it is adjacent the conveying location. In this way, the article is sucked from the recess in the bottom of the container up against the open end of the tube, and held in that position as the tube is moved by the arm from the loading location to the conveying location. Then, the pressure in the tube is increased so that the article is released from the tube and dropped into the conveying location.

In the preferred form of the invention, the articles are discharged at the conveying location into a jig disposed on a carrier mounted on a flexible conveyor such as a roller chain. The chain and carriage are advanced intermittently past the conveying location by power supplied from the cam shaft so that the movement of the carriage is automatically synchronized with the picking up and discharging of the articles in the jig on the carriage.

In the preferred form, many carriages are mounted on the endless conveyor at longitudinally spaced locations, and each carriage is mounted to pivot about an axis transverse to the direction of conveyor travel and located to the rear of and below the center of gravity of each carriage so the carriages tend to tilt or fall forward as they approach the conveying location. Each carriage has an outwardly extending guide means, such as rollers, which mate in appropriate guide means adjacent the conveyor so that each carriage is held in a horizontal position as it moves past the conveying location.

Each carriage also has a longitudinal groove into which fits an elongated stationary spring or tongue mounted at an unloading station adjacent the endless conveyor to remove jigs automatically from the carriages on the conveyor as the carriages move past the unloading tongue.

Thus, articles are individually selected at random from a loose group of articles, moved to a loading location, transferred from the loading location into a conveying location in a jig on a carriage carried by an endless conveyor, and transported by the endless conveyor to an unloading station where they are removed with the jig for further processing, such as baking in an oven, alloying, etc.

These and other aspects of the invention will be more fully understood from the following detailed description taken in conjunction with accompanying drawings, in which:

FIG. 5 is a fragmentary plan view of the article container in a tilted position and the transfer arm moved so the tubes are at the conveying location over the conveyor;

FIG. 6 is a view taken on line 6—6 of FIG. 1;

FIG. 7 is a view taken on line 7—7 of FIG. 1;

FIG. 8 is a view taken on line 8—8 of FIG. 1;

FIG. 9 is a view taken on line 9—9 of FIG. 2;

FIG. 10 is a fragmentary side elevation of one of the carriages mounted on the endless conveyor;

FIG. 11 is a view taken on line 11—11 of FIG. 10;

FIG. 12 is a plan view of a bottom jig adapted to be mounted on a carriage;

FIG. 13 is a plan view of a top jig adapted to be mounted on the bottom jig; and FIG. 14 is a fragmentary side elevation of the top length of the endless conveyor and carriages mounted on it.

Figure 1:
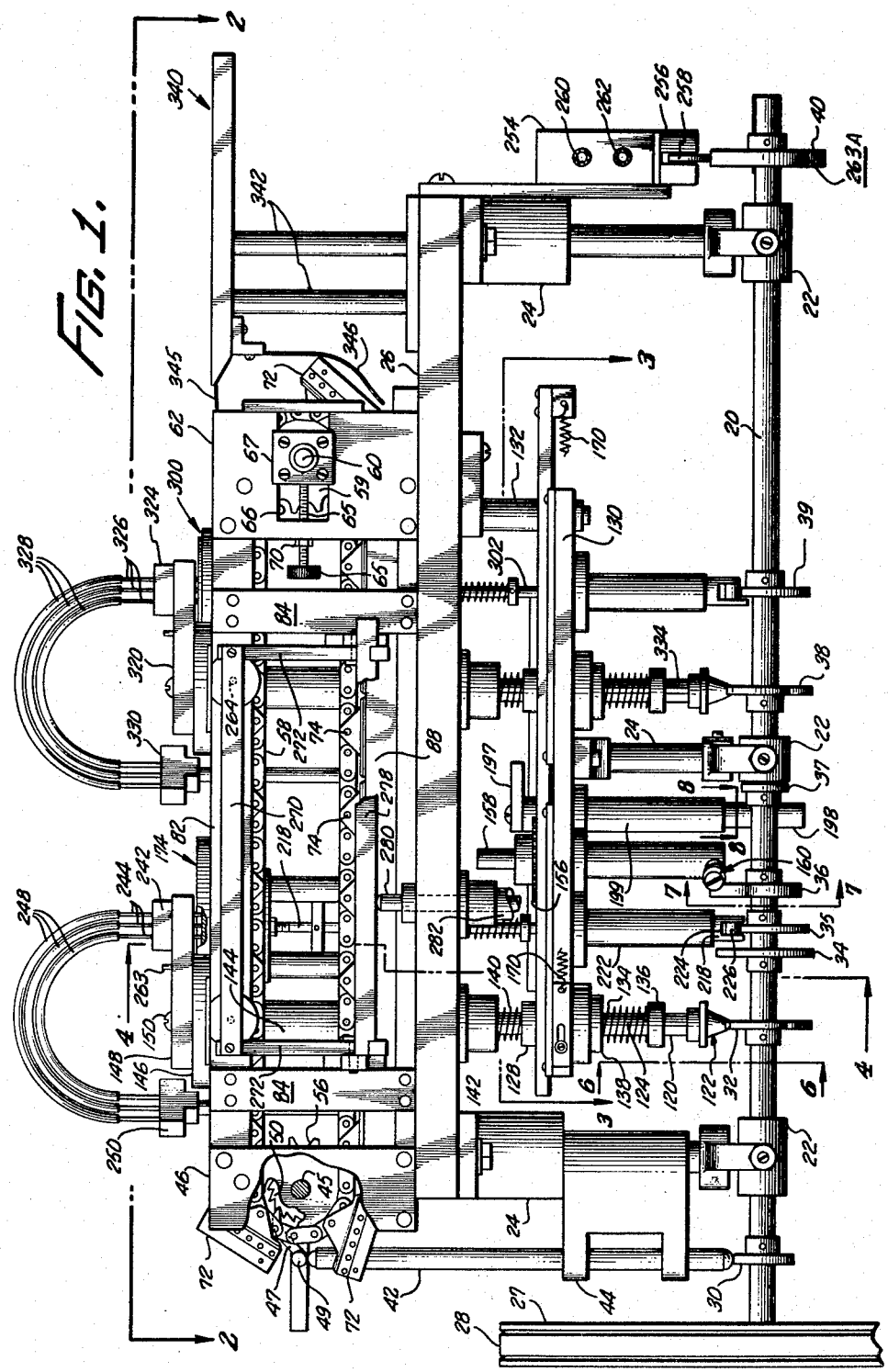
FIG. 1 is a fragmentary elevation, partly broken away, of the presently preferred embodiment of the invention.

Referring to FIG. 1, the machine includes a horizontal cam shaft 20 supported for rotation at each end and in its center by bearings 22, which are suspended by brackets 24 under a horizontal flat table 26 mounted on conventional supports (not shown). A drive pulley 27 mounted on the left (as viewed in FIGS. 1 and 2) end of the cam shaft is powered by a V belt 28 connected to the drive of a conventional electric motor (not shown).

Moving from left to right, the cam shaft has mounted on it a chain drive cam 30, a first transfer arm lifting cam 32, a locking rocker cam 34, a first disk tilting cam 35, an arm rotating rack cam 36, a disk rotating cam 37, a second transfer arm lifting cam 38, a second disk tilting cam 39, and a valve cam 40 at the extreme right end of the cam shaft.

Figure 2:
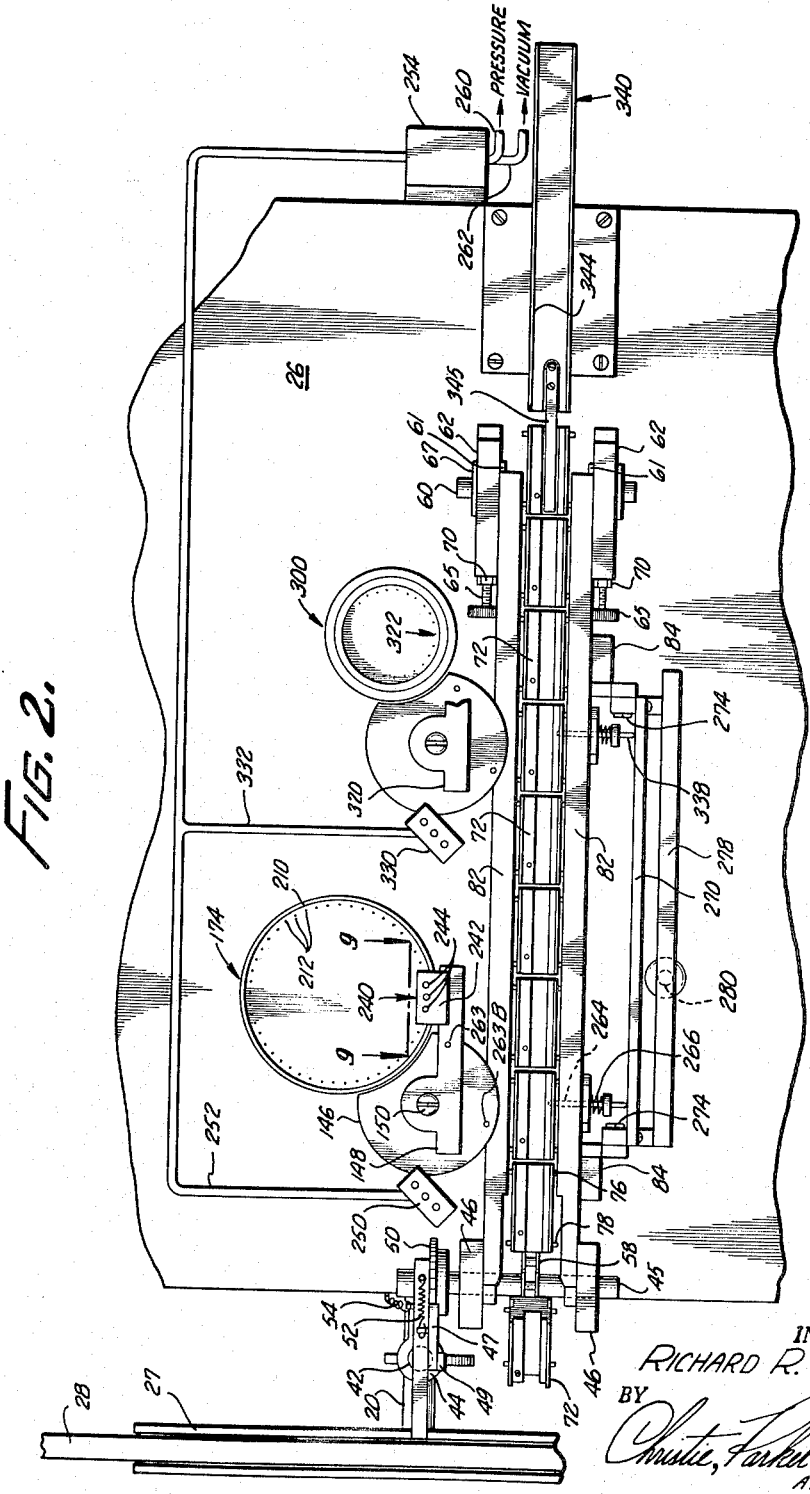
FIG. 2 is a fragmentary view, partly broken away, taken on line 2—2 of FIG. 1.

As the cam shaft is turned in a clockwise direction (as viewed from the left end in FIG. 1), the lower end of a chain drive push rod 42 follows the eccentric surface of the chain drive cam 30 and moves up and down periodically in a guide 44 secured to the underside of table 26. The upper end of the push rod 42 bears against the underside of a horizontal and longitudinally extending lever 44 which is secured at its right end (as viewed in FIGS. 1 and 2) to pivot about a transverse horizontal shaft 45 journaled through a pair of upright supports 46 mounted on the upper surface of table 26. A chain drive pawl 47 is secured to the midway point of the lever 44 to pivot about a transverse and horizontal pin 49. The pawl tooth engages a chain drive ratchet wheel 50 rigidly secured to one end of shaft 45 projecting outboard of one of the supports. A pawl tension spring 52 is secured at its right end (as shown in FIG. 2) to the right end of the lever 44 and at its left end to the chain drive pawl 47 so that the pawl is urged into contact with the ratchet wheel 50. A lever tension spring 54 is secured at its upper end to an intermediate portion of the lever 44 and at its lower end to the plate 26 so the lever is urged downwardly to bear against the upper end of the push rod 42.

Thus, as push rod 42 follows cam 30, the lever 44 is moved up and down causing the ratchet wheel 50 to turn in a clockwise direction (as viewed in FIG. 1) and rotate shaft 45. The chain drive cam 30 is shaped so that the lever 44 is moved up and down in a relatively short interval which is a small fraction of the time required for the cam shaft to make a complete rotation. Thus, shaft 45 is stationary, turns a short distance, and is then stationary again for a relatively long period of time during each revolution of the cam shaft.

A first chain sprocket 56 is rigidly attached to the shaft 45 between the supports 46, and a roller chain 58 is fitted to form an endless loop around the first chain sprocket 56 and a second chain sprocket 59 mounted at the right end of the table on a horizontal transverse shaft 60 journaled in a pair of bearings 61 carried by laterally spaced support plates 62 mounted on the table on opposite sides of the second sprocket.

Tension in the chain is adjusted by a pair of longitudinally extending tension screws 65, each of which is threaded through the left (as viewed in FIGS. 1 and 2) edge of a respective support plate 62 to extend into a respective horizontal slot 66 which opens out of the right side of each plate. A separate bearing mounting plate 67 is secured to the outside face of each bearing 61 for the shaft 60 and is adapted to bear and slide against the outside surface of each respective support 62. Thus, as the tension screws 65 are turned, the shaft 60 is forced to slide toward or away from the shaft 45. When the screws are set to obtain the desired tension, they are locked in place by locking nuts 70.

As shown most clearly in FIG. 14, a plurality of carriages 72 are secured by separate respective transverse pivot pins 74 to the outside of the endless chain at longitudinally spaced locations. Each carriage is mounted so that its center of gravity lies forward, i.e., in the direction of chain travel, of its respective pivot pin so that the carriages on the upper part of the chain loop tend to rotate in a clockwise direction (as viewed in FIG. 14) about their respective pivot pins 74. Each carriage has a front pair of horizontal rollers 76 on each side and a rear pair of horizontal rollers 78 on each side. The carriage rollers are located to travel in inwardly opening longitudinal slots 80 in a pair of elongated, laterally spaced, and longitudinally extending upper carriage guides 82 mounted on vertical carriage guide supports 84 secured at their lower ends to the table 26. A lower pair of carriage guides 88 mounted just above the table and inside the supports 84 each have inwardly opening longitudinal slots 90 to receive the carriage rollers on carriages that are moving from right to left (as viewed in FIG. 1) on the lower loop of the chain.

As shown best in FIGS. 10 and 11, each carriage includes a longitudinal horizontal groove 92 in its sides. An indexing strip 94 is pressfitted into the groove 92 on the right side of each carriage, and each indexing strip 94 includes a plurality of longitudinally spaced carriage indexing holes 96, which serve a purpose described in detail below. The upper surface of each carriage includes a relatively deep and narrow longitudinal groove 98 and a pair of shoulders 100 in its upper surface on each side of groove 98 to receive a bottom jig 102, which is also shown in FIG. 12. The left shoulder (as viewed in FIG. 11) in the upper surface of each carriage includes a separate upwardly extending jig-location pin 104 which fits into a matching opening 106 in the bottom of each bottom jig so the jig is accurately positioned on the carriage with respect to the indexing holes 96 on the side of the carriage. Each jig has a plurality of recesses 108 in the top surface of its bottom to receive articles, such as semiconductor components, to be handled by the machine.

As can be seen best in FIG. 12, the recesses 108 in the bottom jig are located in transverse rows of three abreast, each row defining a curve which is slightly concave in the direction of carriage travel, i.e., from right to left as viewed in FIGS. 11 and 12. The purpose of the curvature is explained below. Each bottom jig has side walls 110 which are notched at 112 to receive outwardly extending ears 114 on a top jig adapted to rest on the bottom jig. As shown best in FIG. 13, the top jig has a plurality of openings 116 extending through it, each opening being located to fit exactly over a respective recess in the bottom jig when the ears 114 are fitted in the notches 112 of the bottom jig.

The lower end of a first transfer arm push rod 120 is provided with a "ball-point" unit 122, which is shown in detail in FIG. 6, and which rides on the surface of the first transfer arm lifting cam 32. The ball point unit 122 includes a socket 122A secured by a transverse tapered pin 122B to the lower end of the push rod 120, which fits into an upwardly opening recess 122C in the upper end of the socket 122A. The lower end of the socket includes a concave spherical portion 122D which receives a ball 122E held in place by a collar 122F threaded onto the socket 122A. The lower end of the collar 122F is below the center of the ball and open to a slightly smaller diameter so the collar holds the ball in the spherical portion 122D of the lower end of the socket. The upper edge of the collar butts against an annular shoulder 122G without binding the ball against the lower end of the socket. Thus, the ball is free to roll about any axis. This is particularly important because the ball must roll on the surface of the first transfer arm lifting cam 32, and also permit the shaft 120 to rotate about its longitudinal axis as described in detail below.

As shown best in FIG. 6, the transfer arm lifting cam 32 has two diametrically opposed lifting sections 122H, 122I, which are arcs of a common circle. The cam 32 also includes a relatively wide V-shaped discharge section 122J and an almost flat pick-up section 122K which includes a "double pass" pip 122L in its intermediate portion, the purpose of which is described in conneciton with the operation of the machine below.

The intermediate portion of the push rod 120 has a spline 124 which slides in a vertical groove 126 in a horizontal first gear 128 (see FIG. 3) journaled for rotation in a horizontal rack plate 130 secured to the underside of the table 26 by suitable means, such as downward extending support rods 132. A lower compression spring 134 is disposed coaxially around the splined portion of the push rod 120 to bear against the top surface of a collar 136 secured to the push rod, and against the under surface of a hub 138 on the first gear 128. Thus, the push rod 120 is urged downwardly by the lower compression spring 134 to follow the surface of cam 32. An upper compression spring 140 is disposed coaxially around the upper splined portion of the push rod 120 and bears against the top surface of the gear 128 and the underside of a journal 142 mounted on the bottom of the table 26. The upper spring 140 holds the gear 128 down on the rack plate as the push rod 120 slides through the gear. The upper portion of the push rod 120 extends up through a vertical hollow column 144 mounted on the top of the table 26 and having an outwardly extending horizontal flange 146 at its upper end. A horizontal and elongated first transfer arm 148 is secured by a screw 150 to the upper end of the push rod 120. Thus, the transfer arm is moved up and down through the motion imparted to the push rod 120 by the cam 32.

The transfer arm is also moved in a horizontal plane as the push rod 120 is rotated about its longitudinal axis when the first driven gear is turned by a rack 152 (see FIG. 3) mounted to slide in a guide 154 on the upper surface of the rack plate 130. The rack 152 is reciprocated longitudinally by a driving gear 156 mounted to rotate on the upper surface of the rack plate and be driven by a vertical rack shaft 158 which extends down through the rack plate to terminate just above the cam shaft. The lower end of the rack shaft has a laterally extending rack cam follower 160, which is shown in detail in FIG. 7, and which is adapted to be engaged intermittently by the rack cam 36 as the cam shaft rotates in a clockwise direction as viewed in FIG. 7. As shown best in FIG. 7, the rack cam follower includes a roller 162 mounted to rotate about a horizontal axis. The rack cam includes a circular portion 164 of relatively small diameter and a circular portion 166 of considerably larger diameter. The trailing portion of the small diameter part of the rack cam is joined with the larger diameter part by an inclined section 168, which engages the roller 162 and pushes it from left to right (as viewed in FIG. 7) so the rack shaft rotates in a clockwise direction, as viewed in FIG. 3. The large diameter portion 166 of the rack cam holds the roller and rack shaft in the extreme right position until the trailing portion of the large diameter section 166 moves past the roller, thus permitting the rack shaft to be snapped back to the extreme left position shown in FIG. 7 by a tension spring 170 (see FIGS. 1 and 3) attached at its right end to the right end of the rack 152 and at its left end to the rack plate 130.

Figure 3:
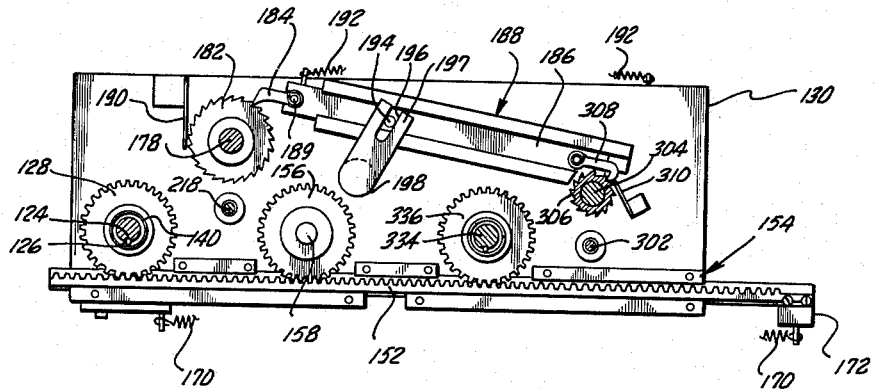
FIG. 3 is a view taken on line 3—3 of FIG. 1.

As shown best in FIG. 3, the right end of the rack 152 includes an outwardly extending stop 172 which engages the right end of the rack plate when the rack cam and rack shaft are in the position shown in FIG. 7. In this condition, the first transfer arm 148 is in the position shown in FIG. 5, i.e., perpendicular to the direction of travel of the conveyor chain. When the rack shaft is turned to the extreme right position, the arm is moved 90° to the position shown in FIG. 2, and is located adjacent the periphery of a container or article-feeding disk 174, which is supported through a universal joint 176 (see FIG. 4) on the upper end of a vertical first disk shaft 178, which is journaled at its lower end in a bearing 180 mounted on the top of the rack plate 130. A first disk ratchet wheel 182 is secured around the lower portion of the shaft 178, and is engaged by a disk drive pawl 184 mounted on the left (as viewed in FIG. 3) end of an elongated disk link 186 adapted to slide in a link guide 188. The disk drive pawl 184 is mounted to pivot about a vertical pivot pin 189 mounted on the left end of the link 186. Thus, as the link is reciprocated longitudinally, the first disk ratchet wheel is rotated stepwise in a counterclockwise direction (as viewed in FIG. 3) and prevented from rotating in the opposite direction by a stop spring 190 mounted on top of the rack plate 130. A link-return tension spring 192 is connected at its right end to the rack plate and at its left end to the left end of the link 186 so the link is urged to move toward the right as viewed in FIG. 3.

The link includes an upwardly extending pin 194 intermediate its ends and disposed within a longitudinal slot 196 located in one end of a link arm 197 attached at its opposite end to a link shaft 198 which extends down through a hollow link shaft column 199 extending through the rack plate 130. The lower end of the link shaft 198 has a laterally extending cam follower 200, which includes a roller 201 adapted to ride on the eccentric surface of the disk rotating cam 37. The link-return spring 192 urges the link shaft to rotate clockwise (as viewed in FIG. 8 and as indicated by the arrow). Thus, as the cam shaft 20 rotates, the eccentric disk rotating cam 37 moves the cam follower 200 in a horizontal plane causing the link shaft to rotate the link to reciprocate and turn the first disk ratchet wheel intermittently in phase with another operation described in detail below.

The first disk 174 includes an annular upright wall 210 around its periphery so that the upper surface of the disk forms a container which can hold a loose group of articles, such as semiconductor components (not shown) to be selected individually from the first disk or container and transferred to the jigs on the carriages. As shown best in FIGS. 2 and 5, the top surface of the first disk bottom includes a plurality of circular recesses 212 around its periphery and adjacent the side wall. When in the horizontal position shown in FIGS. 1 and 2, the first feeding disk rests on first, second, and third upright supports 213, 214, and 215, respectively, (see FIGS. 4 and 5) mounted on top of the table 26. An upright disk-indexing pin 216 fits into one of a plurality of disk-indexing holes 217 in the bottom of the first disk and located around the periphery of the disk bottom. The first disk is tilted about a horizontal axis in a counter-clockwise direction (as viewed in FIG. 4) by a vertical disk-tilting push rod 218 disposed under the first disk bottom to the right (as viewed in FIG. 4) of the disk universal joint 176, and between the first and second supports 213, 214, as shown in FIG. 5. A pair of independent rollers 220 are mounted on the upper end of the disk-tilting push rod 218 to be rotatable independent of each other about a horizontal axis and at equal distances on opposite sides of a diameter of the first disk bottom passing over the third support 215. The disk-tilting push rod 218 extends down through the table 26, the rack plate 130, a guide sleeve 222 secured to the underside of the rack plate, to terminate just above the first tilting cam 35. The lower end of the first disk-tilting push rod 218 includes a notch 224 (see FIG. 1) in which a cam follower roller 226 is mounted to rotate about a longitudinal and horizontal axis and ride on the surface of the first tilting cam which has the eccentric shape shown in FIG. 4. A first disk-push-rod compression spring 230 is coaxially disposed around the push rod 218 so the upper end of the spring bears against the underside of the table 26 and the lower end of the spring bears against a collar 232 rigidly secured to the push rod 218. Thus, the first disk-tilting push rod is urged downwardly by the spring 230 so the lower end of the push rod follows the surface of the first tilting cam 35.

Figure 4:
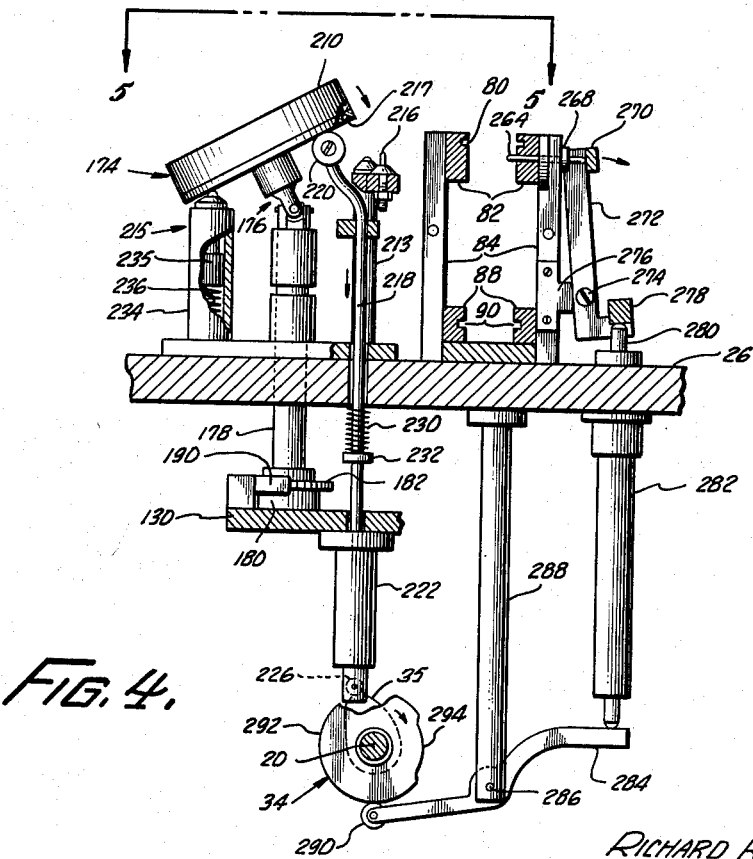
FIG. 4 is a view taken on line 4—4 of FIG. 1.

As shown best in FIG. 4, the third support 215 for the first disk 174 includes an upright hollow sleeve 234 attached at its lower end to the table 26. A slidable plunger 235 is mounted in the sleeve 234 over a compression spring 236 which urges the plunger upwardly. The upper end of the plunger 235 includes a ball-point bearing of the type shown in FIG. 6 and which bears against the underside of the first disk, tending to move the disk-tilting cam 35 to the position shown in FIG. 4, the disk is tilted in a clockwise direction, depressing the plunger 235 in the third support 215. As the cam shaft continues to rotate, the push rod spring 230 and the plunger spring 236 restore the first disk to the horizontal position shown in FIGS. 1 and 2. When the disk is in the tilted position shown in FIG. 4, the semiconductor components, or other articles, slide to the low point in the disk and tend to locate in the recesses 212 in the disk bottom. The recesses are of such shape that only one of the articles to be handled will fit in each recess. While the disk is still tilted, the disk rotating link 186 (FIG. 3) is reciprocated from right to left, causing the tilted disk to be rotated. This advances part of the disk bottom with recesses filled with articles out of the lowest position and moves the articles trapped in the recesses away from the remaining loose group of articles and toward a loading location 240, which is the part of the first disk nearest the conveyor.

Referring to FIG. 2, the unpivoted end of the first transfer arm 148 carries a pick-up tube mounting block 242 through which extend three elongated and vertical pick-up tubes 244. Each of the tubes makes a sliding fit through the mounting block so the tubes can slide vertically with respect to the block. As shown best in FIG. 9, a separate compression spring 245 is disposed coaxially around each tube so the upper end of each spring bears against the underside of the mounting block and the lower end of each spring bears against a separate collar 246 secured to each tube below the block. Separate stop collars 247 are secured around each tube above the block to limit the downward travel of each tube. Separate flexible air hoses 248 are connected at one of their ends to the upper ends of each of the pick-up tubes 244 and are connected at their other ends to a first pressure manifold 250, which is connected to an airline 252, which in turn is connected to a 3-way valve 254 having a downwardly extending control shaft 256 (see FIG. 1) equipped with a roller 258 adapted to ride on the valve cam 40 at the extreme end of the cam shaft. The 3-way valve has a first inlet 260 connected to a suitable source of air pressure, and a second inlet 262 connected to a suitable vacuum source (not shown). Conveniently, the pressure and vacuum can both be supplied by a conventional air compressor (not shown), the pressure line 260 being connected to the compressor discharge and the vacuum line 262 being connected to the compressor inlet. The valve cam 40 is circular except for a small recessed pressurizing portion 263A (see FIG. 1) which permits the control shaft 256 to drop down and supply air pressure to the line 252 for a brief interval each revolution of the cam shaft.

As shown best in FIG. 2, when the transfer arm is parallel to the conveyor, the pick-up tubes are disposed over the loading location of the first disk, and their lower ends are located above separate respective recesses in the disk. To this end, the tubes are set on an arc which matches that of the disk recesses. When the arm is moved to the position shown in FIG. 5, i.e., perpendicular to the chain, each tube is disposed over a respective recess in the bottom jig or conveying location, the recesses in the bottom jig being set on an arc matching that of the lower ends of the tubes.

As shown in FIGS. 2, 5, and 9, the first transfer arm includes a downwardly extending indexing pin 263 which fits into a first indexing hole 263A in the flange 146 of the transfer arm post 144 when the indexing arm is in the loading location shown in FIG. 2. The indexing pin 263 fits into a second indexing hole 263B in the upper surface of the flange 146 when the arm 148 is in the discharge position shown in FIG. 5.

As can be seen best in FIGS. 2 and 4, a first carriage locking pin 264 extends horizontally and transversely through the right upper carriage guide 82 (as viewed in FIG. 4) and is urged to the right by a compression spring 266 (see FIG. 2) disposed coaxially around the spring to bear against the support 84 and a collar 268 mounted on the pin. The right end of the first pin 264 bears against the inside of a horizontal and longitudinal upper cross bar 270 mounted at each end on a pair of upright L-shaped rockers 272 secured to pivot about longitudinal and horizontal pins 274 mounted on pivot supports 276 on the guide supports 84. A lower horizontal and longitudinal cross bar 278 mounted on the horizontal portion of the rocker arms rides on the upper end of a vertical rocker push rod 280 journaled through the table 26 and a column 282 to terminate at its lower end on the upper surface of a lifter 284 secured intermediate its ends by a horizontal and longitudinally extending pivot pin 286 in the lower end of a downwardly extending hanger 288 mounted at its upper end to the underside of the table 26. The left end of the lifter 284 includes a roller 290 mounted to ride on the surface of the rocker cam 34 which has the shape shown in FIG. 4, i.e., circular about a relatively large diameter for a major portion 292 and circular about a smaller diameter for a minor portion 294. Thus, as the rocker cam 34 is rotated in a clockwise direction (as viewed in FIG. 4) the locking pin 264 is moved in and out of the indexing holes 96 (see FIG. 11) to hold a carriage firmly in the desired conveying location.

A second feeding disk 300 (FIGS. 1 and 2) slightly smaller in diameter but otherwise identical to the first feeding disk is mounted on the table 26 in a manner identical with that described for the first feeding disk. The second disk is tilted by a push rod 302 which is actuated by the second disk-tilting cam 39 to tilt the second disk about a second universal joint (not shown) mounted on the upper end of a second disk shaft 304 journaled through the table 26. A second disk ratchet wheel 306 is driven by a second disk pawl 308 mounted at the right end of the link 186 as shown in FIG. 3, and in turn rotates the second disk shaft 304. A second ratchet-wheel holding spring 310 is mounted on the rack plate to prevent the shaft 304 from rotating in a clockwise direction. Thus, the two feeding disks are tilted and rotated simultaneously by the cam shaft and their respective associated elements.

A second transfer arm 320 is mounted in a manner substantially identical with that for the first transfer arm so that it is successively moved from a second loading location 322 over the peripheral part of the second disk nearest the conveyor chain to a conveying location directly over a carriage carried by the chain. The second arm includes a second pick-up tube mounting block 324, a second set of three pick-up tubes 326 constructed exactly as described for the first set of pick-up tubes, and three flexible hoses 328 connecting the second set of pick-up tubes to a second pressure manifold 330, which is connected by a lateral line 332 to the air hose 252. The second transfer arm is moved up and down by a second transfer arm push rod 334 which rides on the second transfer arm lifting cam 38, and is constructed and arranged exactly as described for the first transfer arm lifting mechanism. The second transfer arm push rod 324 being splined to a second driven gear 336 on the rack plate and driven by the rack 152 simultaneously with the first driven gear 128. A second locking pin 338 identical with the first locking pin is mounted to be driven by the rocker 272 laterally into an indexing hole 96 in a carriage in the conveying position adjacent the second transfer arm.

An elongated discharge track 340 is mounted colinearly at the right end (as viewed in FIGS. 1 and 2) of the upper carriage guides 82 on a pair of upright posts 342. The discharge track has a groove 344 which matches the wide longitudinal groove in the carriers. An unloading tongue 345 extends longitudinaly from the left end of the discharge track into the long narrow groove of each carriage as it moves past the discharge track. Thus, each jig on the carriage moving down past the discharge track is lifted by the tongue and pushed onto the discharge track by the succeeding jig on the following carriage. A carriage return guide spring 345 is mounted under the left end of the discharge track 340 to hold each carriage in a horizontal position as it starts back to the left (as viewed in FIG. 1) and guides the carriage rollers 76, 78 into the grooves 90 in the lower carriage guides 88 (FIG. 4).

*Operation of the apparatus*

The apparatus is operated as follows. The electric motor (not shown) is turned on so that the pulley and cam shaft 20 are driven in a clockwise direction (as viewed in FIG. 4), causing the various cams on the cam shaft to turn and actuate their respective cam followers. The chain drive cam 30 advances the chain each complete rotation of the cam shaft by a distance exactly equal to the spacing between adjacent indexing holes 96 (see FIGS. 10 and 11) in the sides of the carriages. This distance is also exactly equal to that longitudinal distance between adjacent rows of recesses and hole in the bottom and top jigs respectively.

Assuming that the apparatus is in the condition shown in FIGS. 1 and 2, i.e., with the first and second transfer arms parallel to the conveyor chain so the pick-up tubes are disposed over their respective loading locations, the rack cam 36 is in the position shown in FIG. 1 (about 180° from the position shown in FIG. 7) so that the rack shaft cam follower and rack 152 are moved to the extreme right and the two driven gears 128, 336 are turned counterclockwise (as viewed in FIG. 6) thereby holding the two arms in their respective first positions against the tension of spring 170 so that the lower ends of the pick-up tubes are disposed over the respective loading locations of the first and second disks. The first and second transfer arm lifting cams 32, 38 are in a position approximately 180° from that shown in FIG. 6 so that the arms are in the lowermost position and the lower ends of the tubes are in contact with the articles in the recesses in the loading locations. As the same time, the valve cam 40 is in the position shown in FIG. 1 so that the 3-way valve is set to connect air line 252 to the vacuum, and thus suck the articles up against the lower ends of the pick-up tubes. The double pass pip 122L in the pick-up segment of the transfer arm lifting cams causes the lower ends of the tubes to make two passes or do a "double bounce" over the recesses in the loading locations to insure positive pick up of an article by each tube. Since each tube is spring loaded to slide longitudinally with respect to the mounting block on the arm, the lower ends of the tubes are pressed into firm contact with the articles and without damaging the articles or the tubes. At the same time, the indexing pins on the arms fit into the indexing holes in the respective flanges under the arms to insure accurate alignment of the arms and tubes over the loading location.

With the vacuum still applied to each tube, each transfer arm is lifted by its respective lifting cam and rotated in a clockwise direction (as viewed from above) by its respective driven gear on the rack plate due to release of the rack shaft cam follower when the rack cam 36 turns to the position shown in FIG. 7, and the rack is returned to the position shown in FIG. 3. The transfer arm lifting cams then turn so that the followers for those cams move into the discharge position, causing the transfer arms to be lowered while they are perpendicular to the chain conveyor. The indexing pin on such arm extends down into the second indexing hole on the flange under each arm to insure accurate alignment of each tube over a respective recess in the bottom jig (the top jigs are not yet in position). While the arms are in the lower discharge position, the valve cam 40 turns so that its recessed pressuring portion 263 permits the valve shaft 256 to drop down momentarily and apply a pulse of positive air pressure to the pickup tubes. This releases the articles from the lower ends of the tubes and they drop into their respective recesses.

In the meantime, the tilting cams 35 and 39 are in the position shown in FIG. 4 so that the two disks are tilted counterclockwise (as viewed in FIG. 4) and rotated in a clockwise direction (as viewed from above) by actuation of the disk rotating link 186, which is turned by the disk rotating cam 37 moving to the position shown in FIG. 8 to cause each disk shaft to rotate sufficiently to carry the three empty recesses out of each loading location and move three loaded recesses into the loading location. At the same time, three empty recesses move into and under the loose batch of articles at the lower edge of the tilted disk so that three more recesses are filled. Thus, a loose pile of articles are kept in the vicinity of the left edge (as viewed in FIG. 4) of each of the disks so that individual articles are selected at random from the loose pile as the disk is rotated through its lowest point.

The carriage locking pins are withdrawn as the locking cam moves so that its small diameter portion 294 engages the follower 290 on the lifter 284, and the chain conveyor is advanced one row of recesses as the chain drive cam lifts the chain driven push rod 42 so that the conveyor chain is being advanced incrementally to move a row of loaded recesses in the bottom jig from the conveying location and a following row of empty recesses into the conveying location. When the conveying location is reached by the following row of empty recesses in the bottom jig (the top jig is not in place at the first loading location), the locking rocker cam 34 is in the position shown in FIG. 4 so that the first and second carriage locking pins 264 and 338 are forced into respective indexing holes in the sides of carriages at the first and second discharge locations respectively. The first and second tilting cams 35, 39 move past the position shown in FIG. 4 so that the first and second feeding disks are pushed back by their respective plungers to the horizontal positions shown in FIGS. 1 and 2. The transfer arms are also raised and returned to the loading location as shown in FIGS. 1 and 2, and the foregoing cycle is repeated.

After a carriage leaves the first conveying area adjacent the first disk with the recesses in the bottom jig loaded with articles such as individual semiconductor elements, it is sometimes desirable to add additional material, say an alloying material, to the elements in the jig. This is conveniently done by placing the top jig over the bottom jig and the elements located in the recesses after the bottom jig leaves the first loading location, and before the carriage and bottom jig reach the second loading location adjacent the second feeding disk. Thus, a carriage approaching the second loading location includes a bottom jig with a top jig located on top of it. Each recess in the bottom jig contains an individual semiconductor element, and each hole in the top jig will have placed in it an alloying material or element picked up by the second pickup tubes and discharged into separate respective holes in the top jig as described previously for the bottom jig in the first loading location.

After a carriage leaves the second loading location, it moves over the unloading tongue 345 mounted on the left end (as viewed in FIGS. 1 and 2) of the discharge track. As the carriage starts around the second sprocket 59, it tilts forward to the position shown in FIG. 14, and the top and bottom jigs are lifted off by the unloading tongue and slid to the right along the guide tongue as the carriage advances.

The carriage return guide spring 345 under the left end of the discharge track insures that each carriage passing around the second sprocket 59 is held in a horizontal position as it enter the lower carriage guides 88 and the rollers 76, 78 (FIGS. 8 and 9) on the sides of the carriages enter the grooves 90 (FIG. 4) of the lower carriage guides.

As the carriages leave the left (as viewed in FIGS. 1 and 2) end of the lower carriage guide, and pass up over the first sprocket 56, they tilt forward about their pivot pins 74 as shown in FIG. 4 so that they assume a horiozntal position, and the rollers 76, 78 enter the slots 80 in the upper carriage guides 82. The bottom jig is placed on each carriage as it assumes a level position, and before it reaches the loading location adjacent the first pickup tube.

Thus, the apparatus of this invention automatically selects individual articles at random from a loose group of the articles and accurately positions them in a loading location, and transfers them to a conveying location where they can be assembled in an orderly fashion for further handling or processing.

I claim:

Conveying apparatus comprising a pair of spaced supports, an endless flexible conveyor disposed around the supports, means for driving the conveyor past a loading point and an unloading point, at least one carriage attached to the conveyor to pivot about an axis transverse to the direction of conveyor travel and located below and behind the center of gravity of the carriage when the carriage is at the loading point, means for automatically stopping the conveyor temporarily when the carriage is at the loading point, a jig mounted on the carriage to hold parts to be conveyed by the apparatus, the jig fitting on the carriage to form a longitudinal and forwardly opening recess, and an elongated unloading tongue mounted adjacent the conveyor at the unloading point to extend into the recess between the jig and carriage as the carriage is moved past the unloading point to remove the jig from the carriage.

References Cited in the file of this patent

UNITED STATES PATENTS

| | | |
|---|---|---|
| 1,181,090 | Winkley | Apr. 25, 1916 |
| 1,321,520 | Greer | Nov. 11, 1919 |
| 1,507,301 | Williams | Sept. 2, 1924 |
| 1,637,834 | Oliver | Aug. 2, 1927 |
| 1,708,694 | Fischer | Apr. 9, 1929 |
| 1,768,534 | Aiken | July 1, 1930 |
| 2,031,713 | Johnson | Feb. 25, 1936 |
| 2,380,306 | Hallowell | July 10, 1945 |
| 2,541,386 | Rundquist | Feb. 13, 1951 |
| 2,609,106 | Tesch | Sept. 2, 1952 |
| 2,720,963 | Stanley | Oct. 18, 1955 |
| 2,891,668 | Hunt | June 23, 1959 |
| 2,893,542 | Watkins | July 7, 1959 |
| 3,001,198 | Vossen | Sept. 26, 1961 |